(12) United States Patent
Seo et al.

(10) Patent No.: US 9,084,153 B2
(45) Date of Patent: Jul. 14, 2015

(54) METHOD FOR TRANSMITTING CONTROL INFORMATION AND DEVICE THEREFOR

(75) Inventors: Hanbyul Seo, Anyang-si (KR); Daewon Lee, Anyang-si (KR); Hyungtae Kim, Anyang-si (KR); Jonghyun Park, Anyang-si (KR); Kijun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 238 days.

(21) Appl. No.: 13/992,131

(22) PCT Filed: Dec. 23, 2011

(86) PCT No.: PCT/KR2011/010039
§ 371 (c)(1),
(2), (4) Date: Jun. 6, 2013

(87) PCT Pub. No.: WO2012/087066
PCT Pub. Date: Jun. 28, 2012

(65) Prior Publication Data
US 2014/0321359 A1 Oct. 30, 2014

Related U.S. Application Data

(60) Provisional application No. 61/427,090, filed on Dec. 23, 2010, provisional application No. 61/531,581, filed on Sep. 6, 2011.

(51) Int. Cl.
*H04W 4/00* (2009.01)
*H04W 24/10* (2009.01)
(Continued)

(52) U.S. Cl.
CPC ............. *H04W 24/10* (2013.01); *H04L 5/0057* (2013.01); *H04L 5/0064* (2013.01); *H04W 48/08* (2013.01)

(58) Field of Classification Search
CPC .............................. H04W 80/04; H04W 88/06
USPC .......................................................... 370/328
See application file for complete search history.

(56) References Cited

U.S. PATENT DOCUMENTS

| 2005/0254461 A1 | 11/2005 | Shin et al. |
| 2011/0317652 A1 | 12/2011 | Kim et al. |

(Continued)

FOREIGN PATENT DOCUMENTS

| KR | 10-2006-0047843 A | 5/2006 |
| KR | 20060047843 A | 5/2006 |

(Continued)

*Primary Examiner* — Ronald B Abelson
(74) *Attorney, Agent, or Firm* — McKenna Long & Aldridge LLP

(57) ABSTRACT

The present invention relates to a wireless communication system. More specifically, the present invention relates to a method and a device for reporting channel state information, wherein the method comprises the steps of: receiving configuration information for a period report of CSI from a first transmission point; and transmitting, to said first transmission point, a CSI report for the downlink of a transmission point corresponding to a corresponding subframe among a plurality of transmission points through each subframe that is periodically set according to said configuration information, wherein: one or more subframes corresponding to a second transmission point are used to transmit a CSI report for multi-transmission point cooperative transmission, if rank information reported to said first transmission point prior to said CSI report is a critical value or less; and one or more subframes corresponding to said second transmission point are used to transmit a CSI report for single-transmission point transmission, if the rank information reported to said first transmission point prior to said CSI report is said critical value or more.

12 Claims, 11 Drawing Sheets

(51) Int. Cl.
*H04L 5/00* (2006.01)
*H04W 48/08* (2009.01)

(56) References Cited

U.S. PATENT DOCUMENTS

2012/0033540 A1  2/2012  Kim et al.
2013/0315189 A1* 11/2013  Kim et al. .................... 370/329

FOREIGN PATENT DOCUMENTS

| KR | 10-2008-0111393 A | 12/2008 |
| KR | 20080111393 A | 12/2008 |
| KR | 10-2010-0100644 A | 9/2010 |
| KR | 20100100644 A | 9/2010 |
| KR | 10-2010-0118952 A | 11/2010 |
| KR | 20100118952 A | 11/2010 |
| WO | WO 2008/156254 A1 | 12/2008 |

* cited by examiner

CQI can be calculated such that it corresponds to the type of PMI transmitted together.

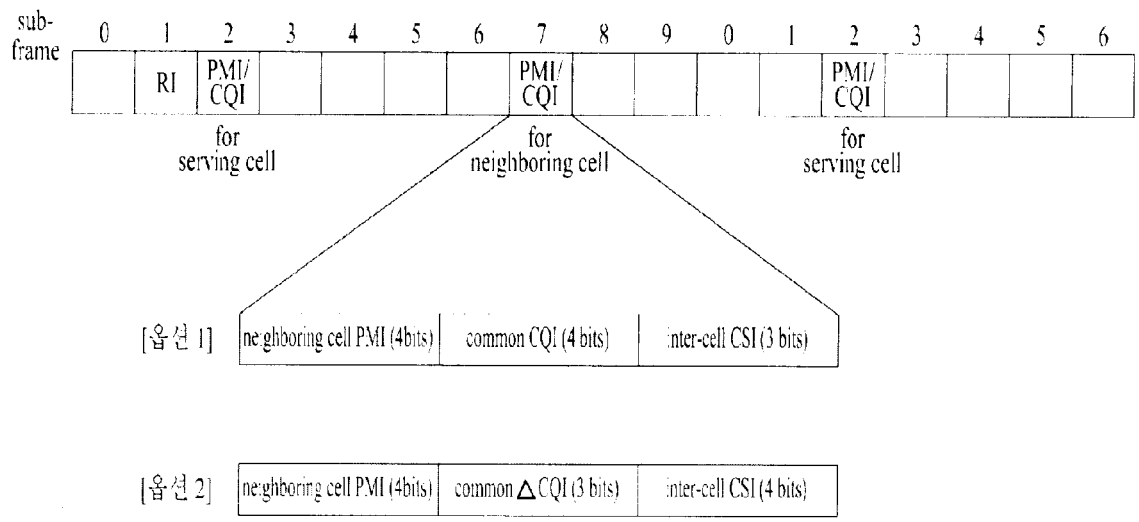

FIG. 13
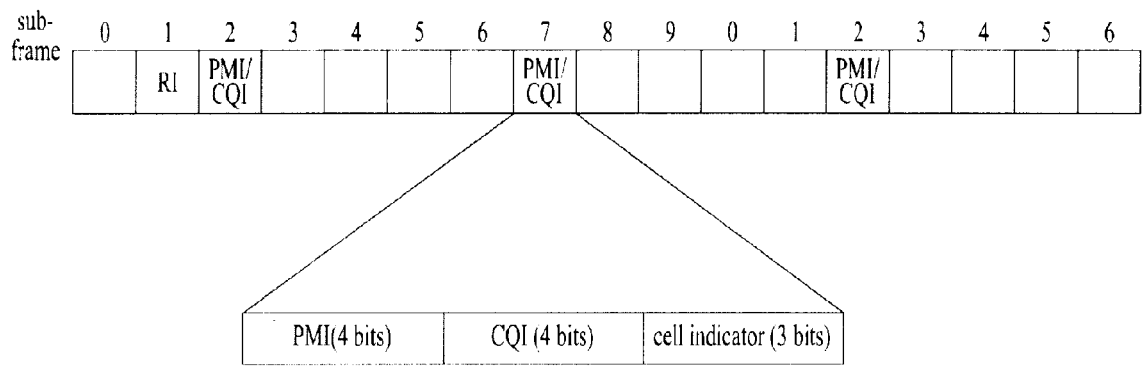
(a) RI ≤ threshold value
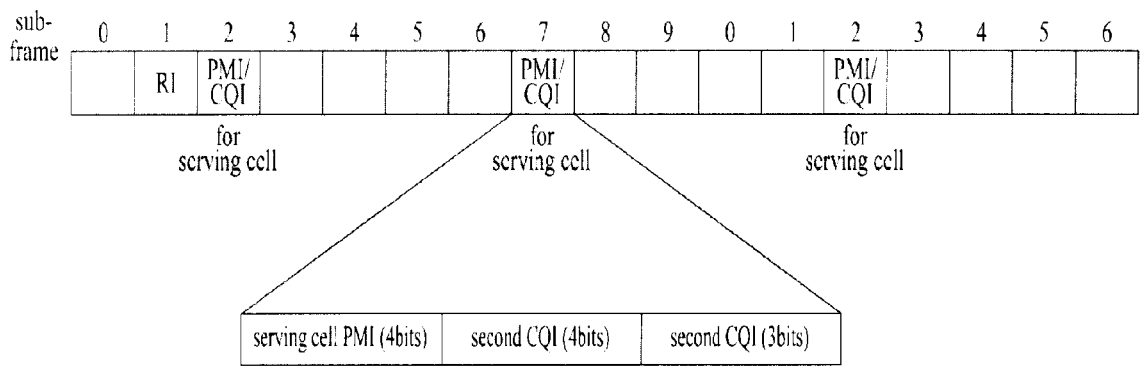
(b) RI < threshold value

METHOD FOR TRANSMITTING CONTROL INFORMATION AND DEVICE THEREFOR

This application is a 35 USC §371 National Stage entry of International Application No. PCT/KR2011/010039 filed on Dec. 23, 2011, and claims priority to U.S. Provisional Application Nos. 61/427,090 filed on Dec. 23, 2010 and 61/531,581 filed on Sep. 6, 2011, all of which are incorporated by reference in their entirety herein.

TECHNICAL FIELD

The present invention relates to a wireless communication system and, more particularly, to a method for transmitting control information and a device therefor.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE

Technical Problem

An object of the present invention devised to solve the problem lies in a method and device for efficiently transmitting control information in a wireless communication system. Another object of the present invention is to provide a method and device for efficiently transmitting channel state information about a downlink. The technical problems solved by the present invention are not limited to the above technical problems and those skilled in the art may understand other technical problems from the following description.

Technical Solution

The object of the present invention can be achieved by providing a method for reporting Channel State Information (CSI) at a user equipment (UE) in a wireless communication system, including: receiving configuration information for a periodic CSI report from a first transmission point; and transmitting, to the first transmission point, a CSI report for a transmission point of plural transmission points through a subframe of subframes being periodically configured according to the configuration information, the transmission point corresponding to the subframe, wherein, if rank information reported to the first transmission point prior to the CSI report is equal to or less than a threshold value, the one or more subframes corresponding to a second transmission point are used to transmit a CSI report for multi-transmission point cooperative transmission; wherein if the rank information reported to the first transmission point prior to the CSI report is greater than the threshold value, the one or more subframes corresponding to the second transmission point are used to transmit a CSI report for single transmission point transmission.

In another aspect of the present invention, provided herein is a UE configured to report Channel State Information (CSI) in a wireless communication system, including: a radio frequency (RF) module; and a processor, wherein the processor configured to receive configuration information for a periodic CSI report from a first transmission point, and to transmit, to the first transmission point, a CSI report for a transmission point of plural transmission points through a subframe of subframes being periodically configured according to the configuration information, the transmission point corresponding to the subframe, wherein, if rank information reported to the first transmission point prior to the CSI report is equal to or less than a threshold value, the one or more subframes corresponding to a second transmission point are used to transmit a CSI report for multi-transmission point cooperative transmission; wherein if the rank information reported to the first transmission point prior to the CSI report is greater than the threshold value, the one or more subframes corresponding to the second transmission point are used to transmit a CSI report for single transmission point transmission.

The CSI report for the multi-transmission point cooperative transmission may include information indicating a relative channel state between downlink signals of the two transmission points.

The information indicating the relative channel state may include information indicating a phase difference or an amplitude difference between downlink signals of the two transmission points.

The CSI report for multi-transmission point cooperative transmission may include cell-selection indication information.

The CSI report for the multi-transmission point cooperative transmission may further include a Channel Quality Indicator (CQI), wherein the CQI is calculated assuming a Coordinated Multi Point Joint Processing (CoMP-JP) mode.

The first transmission point may be a serving base station and the second transmission point may be a cooperative base station.

Advantageous Effects

According to the present invention, channel information can be efficiently transmitted in a wireless communication system. Specifically, channel state information about downlink can be efficiently transmitted.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIGS. 10 to 13 illustrate channel state information (CSI) reporting according to embodiments of the present invention.

BEST MODE

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). 3$^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is an evolution of 3GPP LTE.

While the following description is given, centering on 3GPP LTE/LTE-A to clarify the description, this is purely exemplary and thus should not be construed as limiting the present invention.

In a wireless communication system, a UE receives information from a BS through downlink (DL) and transmits information to the BS through uplink (UL). Information transmitted/received between the UE and BS includes data and various types of control information, and various physical channels are present according to type/purpose of information transmitted/received between the UE and BS.

Figure 1:
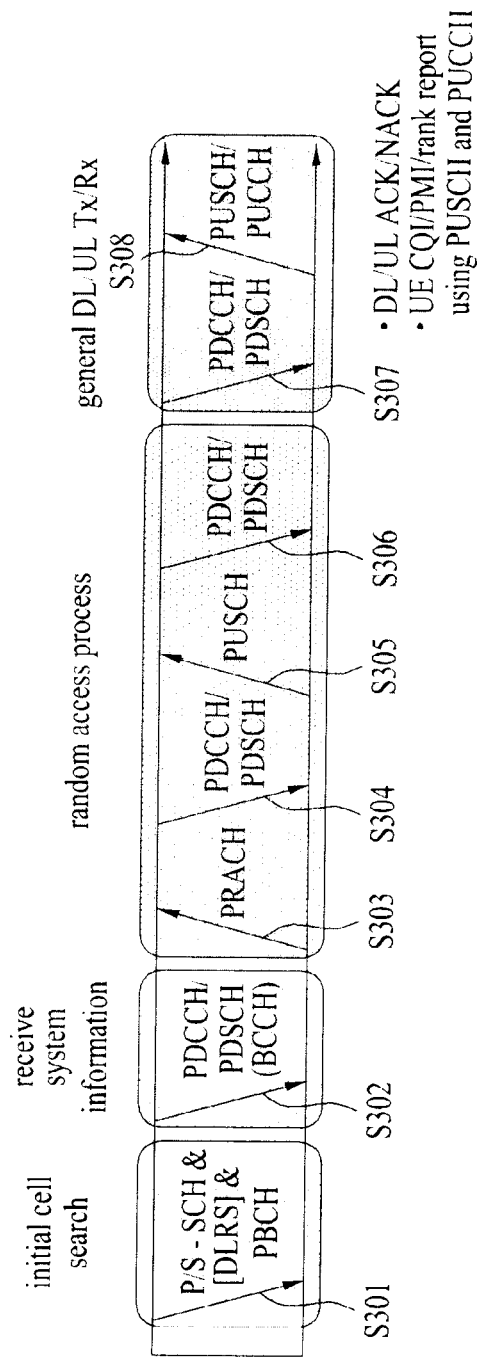
FIG. 1 illustrates physical channels used in a 3GPP LTE system and a signal transmission method using the same.

FIG. 1 illustrates physical channels used in a 3GPP LTE system and a signal transmission method using the same.

When powered on or when a UE initially enters a cell, the UE performs initial cell search involving synchronization with a BS in step S101. For initial cell search, the UE is synchronized with the BS and acquire information such as a cell Identifier (ID) by receiving a Primary Synchronization Channel (P-SCH) and a Secondary Synchronization Channel (S-SCH) from the BS. Then the UE may receive broadcast information from the cell on a Physical Broadcast Channel (PBCH). In the mean time, the UE may determine a downlink channel status by receiving a Downlink Reference Signal (DL RS) during initial cell search.

After initial cell search, the UE may acquire more specific system information by receiving a Physical Downlink Control Channel (PDCCH) and receiving a Physical Downlink Shared Channel (PDSCH) based on information of the PDCCH in step S102.

The UE may perform a random access procedure to access the BS in steps S103 to S106. For random access, the UE may transmit a preamble to the BS on a Physical Random Access Channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a Physical Uplink Shared Channel (PUSCH)/Physical Uplink Control Channel (PUCCH) (S108), as a general downlink/uplink signal transmission procedure. Control information transmitted from the UE to the BS is called uplink control information (UCI). The UCI may include a Hybrid Automatic Repeat and request Acknowledgement/Negative-ACK (HARQ ACK/NACK) signal, scheduling request (SR), a Channel Quality Indicator (CQI), a Precoding Matrix Index (PMI), a Rank Indicator (RI), etc. In the specification, HARQ ACK/NACK is simply referred to as HARQ-ACK or ACK/NACK(A/N). HARQ-ACK includes at least one of positive ACK (simply, ACK), negative ACK (NACK), DTX and NACK/DTX. While the UCI is transmitted through a PUCCH in general, it may be transmitted through a PUSCH when control information and traffic data need to be simultaneously transmitted. The UCI may be aperiodically transmitted through a PUSCH at the request/instruction of a network.

Figure 2:
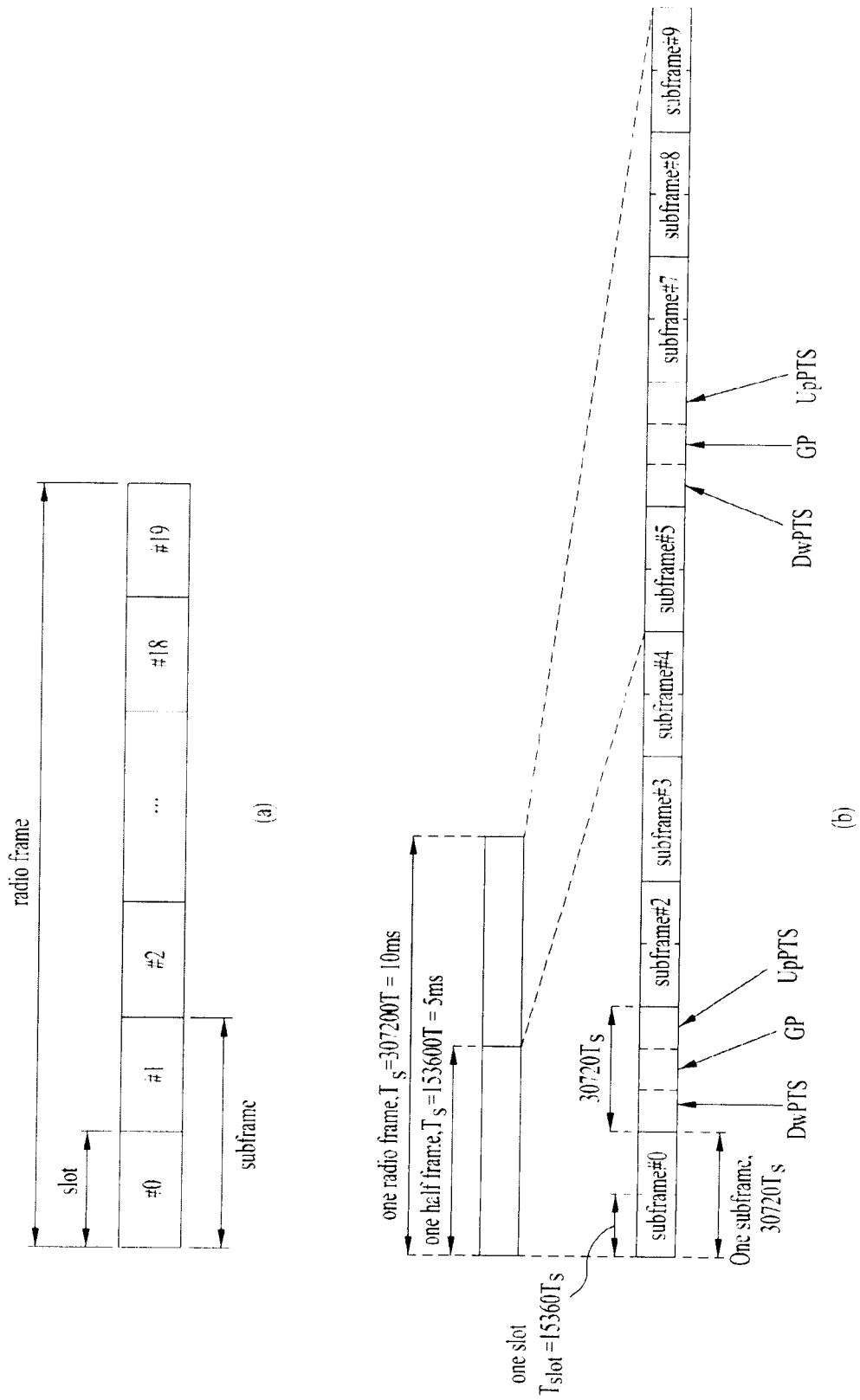
FIG. 2 illustrates a radio frame structure.

FIG. 2 illustrates a radio frame structure. In a cellular OFDM wireless packet communication system, uplink/downlink data packet transmission is performed on a subframe-by-subframe basis. A subframe is defined as a predetermined time interval including a plurality of OFDM symbols. 3GPP LTE supports a type-1 radio frame structure applicable to FDD (Frequency Division Duplex) and a type-2 radio frame structure applicable to TDD (Time Division Duplex).

FIG. 2(a) illustrates a type-1 radio frame structure. A downlink subframe includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on Cyclic Prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 5 subframes, a Downlink Pilot Time Slot (DwPTS), a Guard Period (GP), and an Uplink Pilot Time Slot (UpPTS), and one subframe consists of 2 slots. The DwPTS is used for initial cell search, synchronization or channel estimation. The UpPTS is used for channel estimation in a BS and UL transmission synchronization acquisition in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
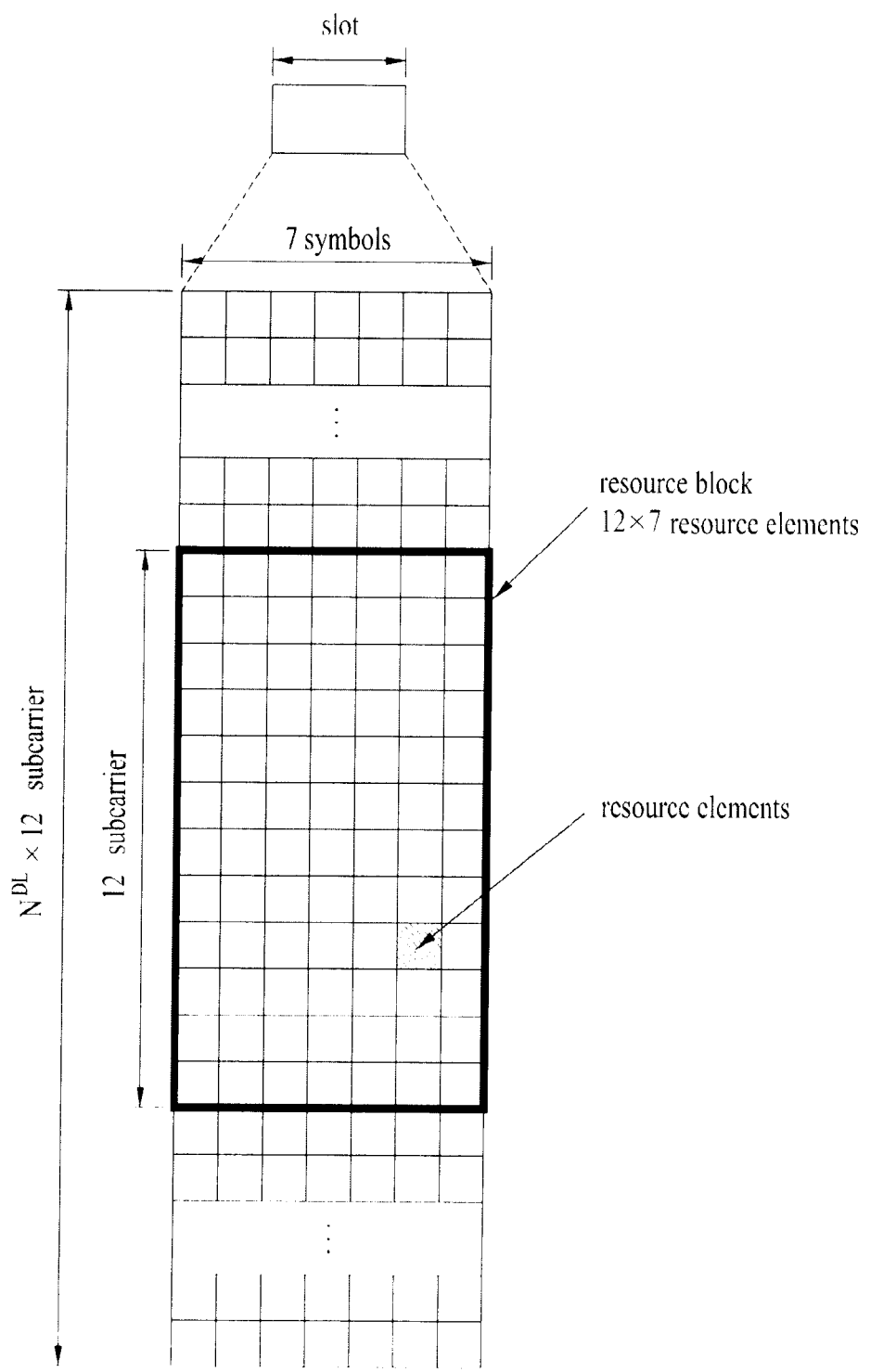
FIG. 3 illustrates a resource grid of a downlink slot.

FIG. 3 illustrates a resource grid of a downlink slot.

Referring to FIG. 3, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of an uplink slot may be same as that of the downlink slot except that OFDM symbols by replaced by SC-FDMA symbols.

Figure 4:
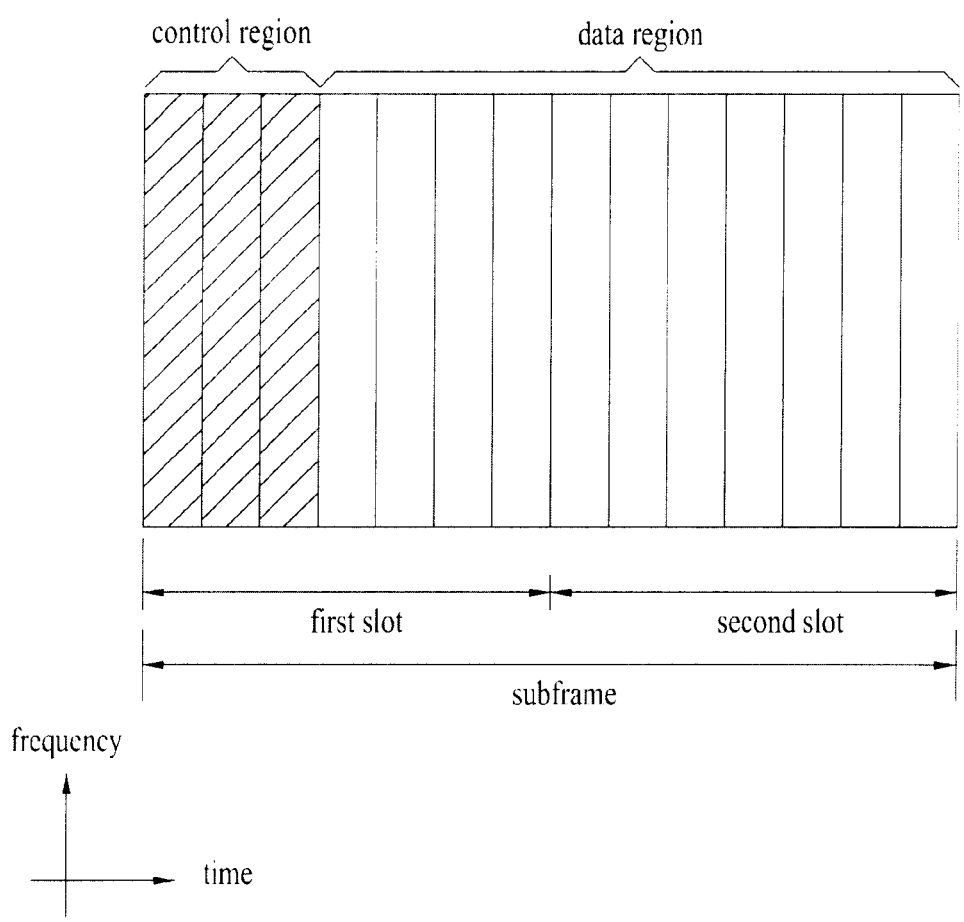
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal.

Control information transmitted through the PDCCH is referred to as downlink control information (DCI). The DCI includes resource allocation information and control information for a UE or a UE group. For example, the DCI includes uplink/downlink scheduling information, uplink transmit (Tx) power control command, etc.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 5:
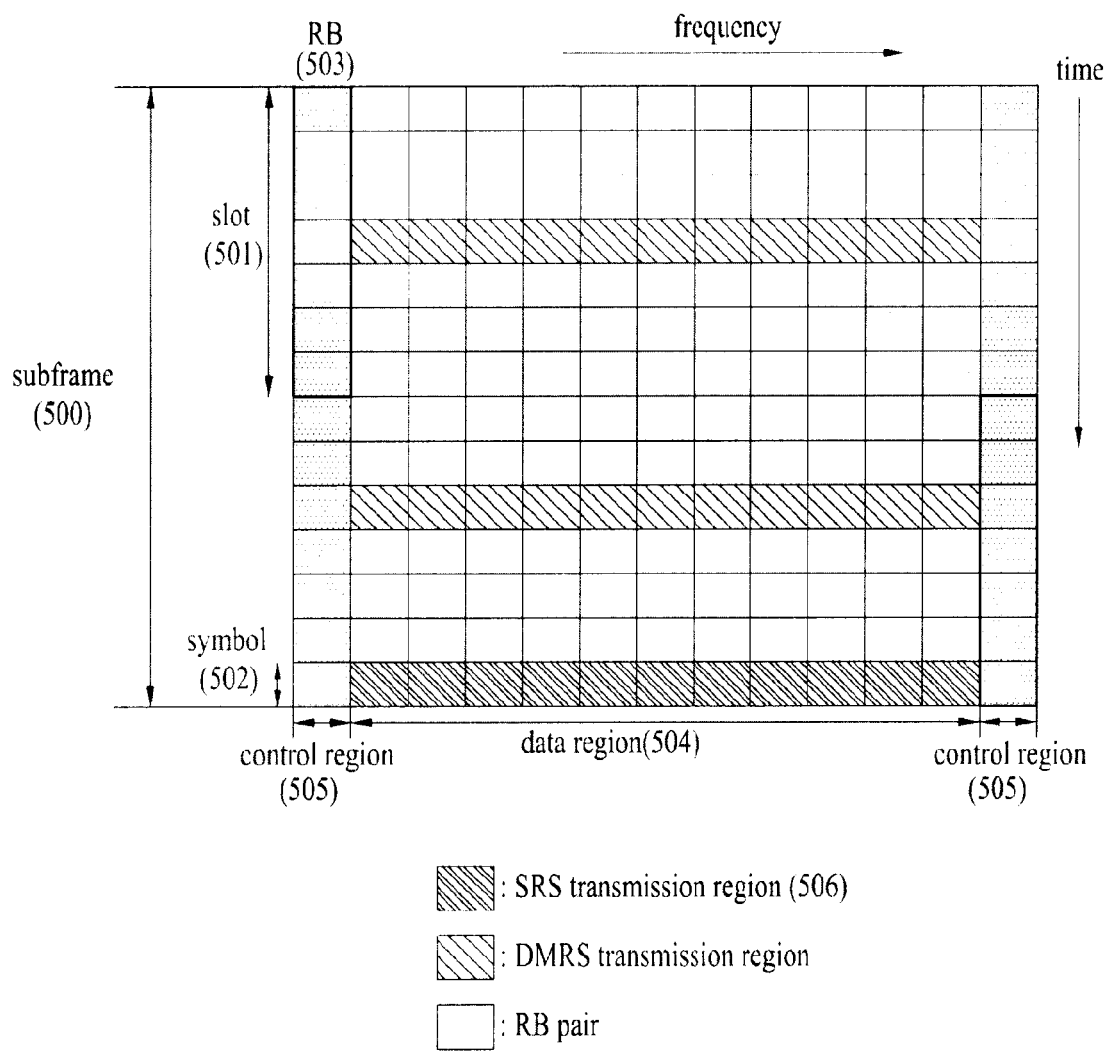
FIG. 5 illustrates an uplink subframe structure.

FIG. 5 illustrates an uplink subframe structure.

Referring to FIG. 5, a subframe 500 of 1 ms in length, which is a fundamental unit of LTE uplink transmission, includes 2 slots 501 each having a length of 0.5 ms. Each slot includes 7 symbols 502 and a symbol corresponds to an SC-FDMA symbol in the case of normal CP. A resource block (RB) 503 is a resource allocation unit corresponding to 12 subcarriers in the frequency domain and corresponding to a slot in the time domain. The uplink subframe of LTE is divided into a data region 504 and a control region 505. The data region includes a PUSCH and is used to carry a data signal such as audio data. The control region includes a PUCCH and is used to carry uplink control information (UCI). The PUCCH includes an RB pair located at both ends of the data region in the frequency domain and hopped in a slot boundary.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords.

Channel Quality Indicator (CQI): This is feedback information about a downlink channel. Feedback information regarding Multiple Input Multiple Output (MIMO) includes Rank Indicator (RI) and Precoding Matrix Indicator (PMI). 20 bits are used per subframe.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports 7 formats according to information transmitted thereon.

Table 1 shows the mapping relationship between PUCCH formats and UCI in LTE.

TABLE 1

| PUCCH format | UCI (Uplink Control Information) |
| --- | --- |
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |

Figure 6:
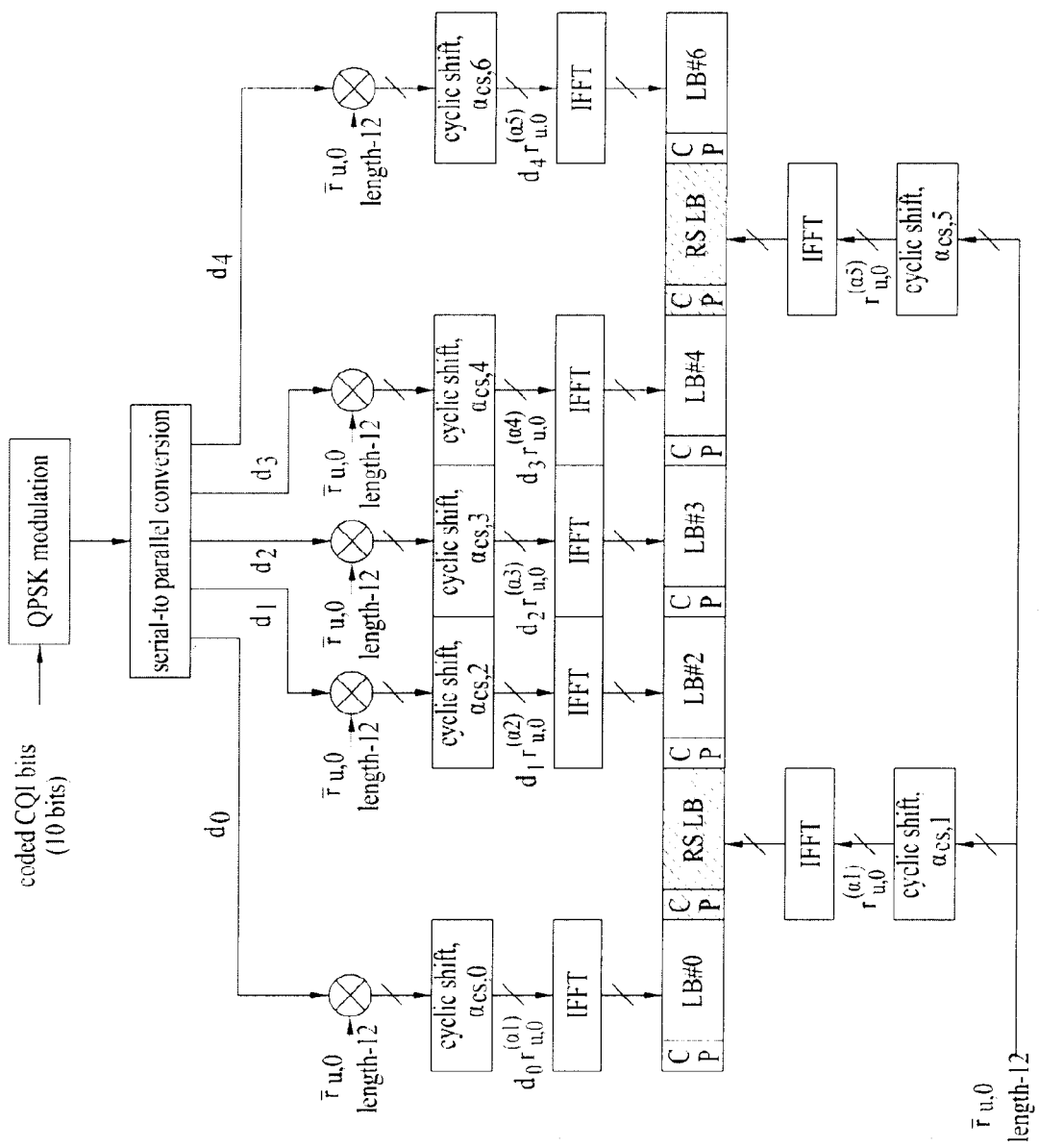
FIG. 6 illustrates a slot level structure of PUCCH format 2/2a/2b.

FIG. 6 illustrates a slot level structure of PUCCH formats 2/2a/2b. The PUCCH formats 2/2a/2b are used for CQI transmission. CSI includes a CQI, a PMI, an RI, etc. In the case of normal CP, SC-FDMA symbols #1/#5 (LB#1/#5) in a slot are used for transmission of a demodulation reference signal (DM RS). In the case of extended CP, only SC-FDMA #3 (LB#3) in the slot is used for DM RS transmission. Information having a maximum of 11 bits can be transmitted through PUCCH formats 2/2a/2b.

Referring to FIG. 6, at a subframe level, 10-bit CSI is channel-coded into 20 coded bits using (20, k) Reed-Muller code punctured at a rate of 1/2 (not shown). The coded bits are scrambled (not shown) and then mapped to Quadrature Phase Shift Keying (QPSK) constellation (QPSK modulation). Scrambling can be performed using length-31 gold sequence in a similar manner that PUSCH data is scrambled. 10 QPSK modulation symbols are generated according to the QPSK modulation, and 5 QPSK modulation symbols $d_0$, $d_1$, $d_2$, $d_3$ and $d_4$ are transmitted through SC-FDMA symbols (LB#0/#2/#3/#4/#6) corresponding thereto in each slot. Each of the QPSK modulation symbols is used to modulate a length-12 base RS sequence $r_{u,0}$ prior to being subjected to Inverse Fast Fourier Transform (IFFT). Consequently, the RS sequence is cyclic-shifted in the time domain according to the QPSK modulation symbol value ($d_x * r_{u,0}^{(\alpha cx)}$, x=0 to 4). The DM RS sequence multiplied by the QPSK modulation symbol is cyclic-shifted ($\alpha_{cs,x}$, x=1,5). When the number of cyclic shifts is N, N UEs can be multiplexed on the same CSI PUCCH RB. While a DM RS sequence is similar to a CSI sequence in the frequency domain, the DM RS sequence is not modulated by a CQI modulation symbol.

Parameters/resources for periodic CQI reports are configured semi-statically according to higher layer (e.g. radio resource control (RRC)) signaling. If PUCCH resource index $n_{PUCCH}^{(2)}$ is set for CSI transmission, for example, CSI is periodically transmitted on a CSI PUCCH linked to PUCCH resource index $n_{PUCCH}^{(2)}$. PUCCH resource index $n_{PUCCH}^{(2)}$ indicates a PUCCH RB and cyclic shift $\alpha_{cs}$.

A description will be given of a multiple-input multiple-output (MIMO) system. MIMO uses plural transmit antennas and plural receive antennas and can improve data transmission/reception efficiency. That is, the throughput and performance of a wireless communication system can be improved by using a plurality of antennas at a transmitter or a receiver of the wireless communication system. In the following, MIMO may be referred to as 'multi-antenna'.

MIMO does not depend on a single antenna path to receive a whole message. Rather, MIMO completes the message by combining data fragments received through a plurality of antennas. MIMO can increase data rate within a cell area having a specific size or extend system coverage at a given data rate. MIMO is broadly applicable to mobile terminals, relays, etc. It is possible to overcome the limit of throughput of conventional mobile communication sing a single antenna through MIMO.

Figure 7:
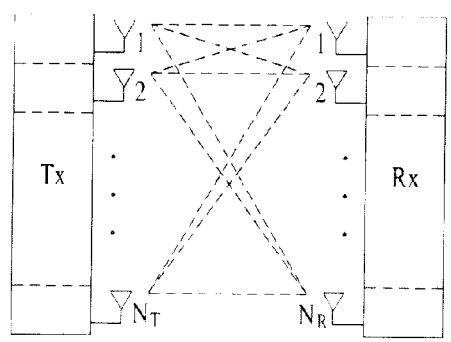
FIG. 7 illustrates a MIMO communication system.

FIG. 7 illustrates a configuration of a typical MIMO communication system. Referring to FIG. 7, When a transmitter uses $N_T$ transmit (Tx) antennas and a receiver uses $N_R$ receive (Rx) antennas, a theoretical channel transmission capacity is increased, compared to use of a plurality of antennas at only one of the transmitter and the receiver. Channel transmission capacity is increased in proportion to the number of antennas. Therefore, transmission rate and frequency efficiency can be increased. Given a maximum transmission rate $R_o$ that may be achieved with a single antenna, the transmission rate may be increased, in theory, to the product of $R_o$ and a transmission rate increase rate $R_i$ illustrated in Equation 1 due to an increase in channel transmission capacity in case of multiple antennas. Here, $R_i$ corresponds to the smaller of $N_T$ and $N_R$.

$$R_i = \min(N_T, N_R) \quad \text{[Equation 1]}$$

For instance, a MIMO communication system with 4 Tx antennas and 4 Rx antennas may theoretically achieve a four-fold increase in transmission rate, relative to a single-antenna system.

Communication in a MIMO system will be described in detail through mathematical modeling. As illustrated in FIG. 7, it is assumed that $N_T$ Tx antennas and $N_R$ Rx antennas are present. Regarding a transmission signal, up to $N_T$ pieces of information can be transmitted through the $N_T$ Tx antennas, as expressed by the following vector.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P s_1, P s_2, \ldots, P s_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmitted signals $x_1, x_2, \ldots, x_{N_T}$ may be generated by multiplying the transmission power-controlled information vectors $\hat{s}$ by a weight matrix W. The weight matrix W functions to appropriately distribute the transmission information to the Tx antennas according to transmission channel states, etc. These $N_T$ transmitted signals $x_1, x_2, \ldots, x_{N_T}$ are represented as a vector X, which may be determined by Equation 5. Herein, $w_{ij}$ denotes a weight between an $i^{th}$ Tx antenna and a $j^{th}$ piece of information. W is called a weight matrix or a precoding matrix.

$$x = \begin{bmatrix} x_1 \\ x_2 \\ \vdots \\ x_i \\ \vdots \\ x_{N_T} \end{bmatrix} \quad \text{[Equation 5]}$$

-continued $$= \begin{bmatrix} w_{11} & w_{12} & \cdots & w_{1N_T} \\ w_{12} & w_{12} & \cdots & w_{2N_T} \\ \vdots & & \ddots & \vdots \\ w_{i2} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s} = WPs$$

The rank of a channel matrix physically means a maximum number of given channels through which different pieces of information can be transmitted. Accordingly, the rank of the channel matrix is defined as the lesser of the numbers of independent rows and columns. Accordingly, the rank of the channel matrix is not larger than the number of rows or columns. For example, the rank of the channel matrix H, rank(H) is limited by Equation 6.

$$\text{rank}(H) \leq \min(N_T, N_R) \quad \text{[Equation 6]}$$

Let information transmitted using MIMO be defined as 'transmission stream' or simply 'stream'. 'Stream' can also be referred to as 'layer'. The number of transmission streams cannot be larger than the channel rank. Accordingly, the channel matrix H can be expressed by Equation 7.

$$\text{\# of streams} \leq \text{rank}(H) \leq \min(N_T, N_R) \quad \text{[Equation 7]}$$

Here, "# of streams" denotes the number of streams. It is noted that one stream can be transmitted through one or more antennas.

There may be various methods for matching one or more streams to a plurality of antennas. These methods can be described according to MIMO types as follows. Transmission of one stream through a plurality of antennas can be considered as a spatial diversity scheme and transmission of a plurality of streams through a plurality of antennas can be considered as a spatial multiplexing scheme. A hybrid of the spatial diversity and spatial multiplexing is possible.

A description will be given of channel state information (CSI) reporting. Open-loop MIMO operating without CSI and closed-loop MIMO operating based on CSI are present in LTE. Particularly, in closed-loop MIMO, each of an eNB and a UE can perform beamforming based on CSI to obtain MIMO antenna multiplexing gain. To obtain CSI from the UE, the eNB instructs the UE to feed back CSI with respect to a downlink signal by allocating a PUCCH or a PUSCH to the UE.

CSI is categorized into an RI, PMI and CQI. The RI indicates rank information of a channel, as described above, and represents the number of streams that can be received by a UE through the same time-frequency resource. The RI is determined by long term fading of the channel, and thus the RI is fed back to an eNB at a longer period than PMI and CQI. The PMI is a value in which spatial characteristics of a channel are reflected and indicates a precoding matrix index of an eNB preferred by a UE based on a metric such as SINR. The CQI indicates channel intensity and represents a reception SINR that can be obtained by the eNB using the PMI.

All or some of the CQI, PMI and RI are transmitted according to the transmission mode of each UE. Periodic transmission of CSI is referred to as periodic reporting and transmission of CSI at the request of an eNB is referred to as aperiodic reporting. In the case of a periodic reporting, a request bit included in uplink scheduling information transmitted from the eNB is sent to a UE. Then, the UE transmits CSI considering a transmission mode thereof to the eNB through a PUSCH. In the case of periodic reporting, a period and an offset of the period are semi-statically signaled to each UE through a higher layer signal on a subframe basis. Each UE delivers CSI considering the transmission mode thereof to the eNB through a PUCCH in a predetermined period. If uplink data is present in a subframe in which CSI is transmitted, the CSI is transmitted with the uplink data through a PUSCH. The eNB transmits transmission timing information suitable for each UE to each UE in consideration of channel state of each UE, UE distribution in a cell, etc. The transmission timing information includes a period in which CSI is transmitted, an offset, etc. and may be transmitted to each UE through an RRC message.

Figure 8:
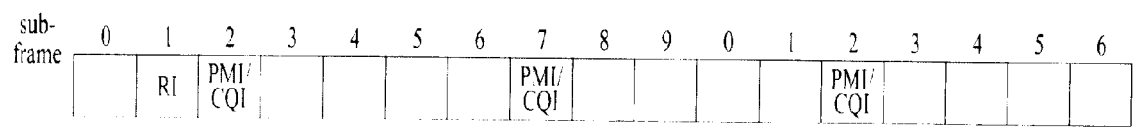
FIG. 8 illustrates periodic channel state information reporting.

FIG. 8 illustrates periodic CSI reporting in 3GPP LTE.

Referring to FIG. 8, a UE reports information about a transmission rank through an RI having a relatively long period and then transmits PMIs/CQIs through transmission of PUCCHs. In 3GPP LTE, CSI having a maximum of 11 bits is transmitted through PUCCH format 2/2a/2b. 4 bits of the 11-bit CSI can be used for information (e.g. precoding matrix index (PMI)) representing a phase/amplitude difference between antenna ports of an eNB. 7 bits of the 11-bit CSI can be used for information (e.g. channel quality indicator (CQI)) representing a modulation and coding scheme (MCS) that can accomplish an error rate of a predetermined level using a PMI reported in the current channel state. When a PDSCH has a transmission rank of larger than 2, CQIs for two codewords are transmitted for CSI reporting. Specifically, 4 bits of 7-bit CSI can represent a CQI of one codeword and the remaining 3 bits can represent a difference between an MCS of the other codeword and an MCS of the first codeword.

More specifically, 4 CSI reporting modes are present in LTE. The CQI reporting modes are categorized into a wideband (WB) CQI mode and a subband (SB) CQI mode according to CQI feedback type and into a no PI mode and a single PMI mode according to whether a PMI is transmitted. Each UE receives information composed of a combination of a period and an offset through RRC signaling for periodic CQI reporting. RI can be signaled by a higher layer (e.g. RRC layer) as a combination of information about a multiple of a CQI (e.g. WB CQI) transmission period, which corresponds to an RI transmission period, and an offset in the RI transmission period. The offset of the RI is signaled as a value relative to the offset of the CQI (e.g. WB CQI). For example, if the offset of the CQI is '1' and the offset of the RI is '0', the RI has the same offset as that of the CQI. The offset of the RI is defined as 0 or a negative value.

In an evolved communication system such as LTE-A, additional multi-user diversity is obtained using MU-MIMO (multi-user MIMO). Since interference is present between UEs multiplexed in the antenna domain in MU-MIMO, accuracy of CSI may largely affect not only a UE that reports the CSI but also interference of other multiplexed UEs. Accordingly, MU-MIMO requires more accurate CSI reporting than SU-MIMO. In LTE-A, a final PMI is divided into W1 corresponding to a long-term and/or wideband PMI and W2 corresponding to a short-term and/or subband PMI.

A long-term covariance matrix of a channel, represented by Equation 8, can be used as a hierarchical codebook transformation constituting a final PMI based on W1 and W2.

$$W = \text{norm}(W1\,W2) \quad \text{[Equation 8]}$$

In Equation 8, W2 corresponds to a short-term PMI and is a codeword of a codebook configured to reflect short-term channel state information, W is a codeword (in other words, precoding matrix) of a final codebook, and norm(A) denotes a matrix in which the norm of each column of matrix A is normalized to 1.

W1 and W2 have structures as represented by Equation 9.

$$W1(i) = \begin{bmatrix} X_i & 0 \\ 0 & X_i \end{bmatrix}, \text{ where } X_i \text{ is } Nt/2 \text{ by } M \text{ matrix}$$ [Equation 9]

$$W2(j) = \overbrace{\begin{bmatrix} e_M^k & e_M^l & \cdots & e_M^m \\ \alpha_j e_M^k & \beta_j e_M^l & & \gamma_j e_M^m \end{bmatrix}}^{r \text{ columns}}$$

(if rank = r), where $1 \leq k, l, m \leq M$ and
k, l, m are integer.

wherein Nt denotes the number of Tx antennas, M is the number of columns of a matrix $X_i$ and represents that the matrix $X_i$ includes M candidate column vectors, and $e_M^k$, $e_M^l$ and $e_M^m$ respectively indicate k-th, l-th and m-th column vectors in which only k-th, l-th and m-th elements from among M elements are 1 and the remaining elements are 0. In addition, $\alpha_j$, $\beta_j$ and $\gamma_j$ are complex values having unit norm and represent application of phase rotation to the k-th, l-th and m-th column vectors of the matrix $X_i$. Furthermore, i is an integer greater than 0 and denotes a PMI indicating W1 and j is an integer greater than 0 and denotes a PMI indicating W2.

In the codeword structure represented by Equation 9, cross polarized antennas are used. When antenna spacing is narrow, for example, when a distance between neighboring antennas is less than half a signal wavelength, correlation characteristics of a channel are reflected in the codeword structure. The cross polarized antennas can be categorized into a horizontal antenna group and a vertical antenna group which have uniform linear array (ULA) antenna characteristics and are co-located.

Therefore, correlation between antennas in each group has the same linear phase increment and correlation between antenna groups has phase rotation characteristics. Consequently, it is necessary to design the codebook by reflecting characteristics of a channel in the codebook because the codebook is composed of values obtained by quantizing the channel. For convenience of description, rank-1 codeword generated in the above-described structure is represented in Equation 10.

$$W1(i) * W2(j) = \begin{bmatrix} X_i(k) \\ \alpha_j X_i(k) \end{bmatrix}$$ [Equation 10]

In Equation 10, the codeword is represented by a vector of $N_T$ (the number of Tx antennas)×1 and is composed of an upper vector $X_i(k)$ and a lower vector $\alpha_j X_i(k)$ which respectively represent correlations between horizontal antenna groups and vertical antenna groups. $X_i(k)$ is preferably represented as a vector having linear phase increment in which correlation between antennas in each antenna group is reflected and can use a DFT matrix.

LTE-A is expected to support coordinated multi-point (CoMP) transmission, which was not supported in any legacy standards, in order to improve data rate. CoMP transmission refers to a scheme through which two or more transmission points (e.g. eNBs or cells) cooperatively communicate with UEs to improve the performance of communication between a UE and an eNB (cell or sector) located in a shadow area.

CoMP transmission schemes may be categorized into joint processing (CoMP-JP) in the form of coordinated MIMO through data sharing and coordinated scheduling/beamforming (CoMP-CS/CB).

In the case of downlink, a UE can simultaneously receive data from plural eNBs that perform CoMP transmission and improve reception performance by combining signals received from the eNBs according to joint processing (CoMP-JP) (joint transmission (JT)). A method by which one of eNBs that perform CoMP transmission transmits data to the UE at a specific time (dynamic point selection (DPS)) may be considered. According to CoMP-CS/CB, the UE can instantaneously receive data from an eNB, that is, a serving eNB through beamforming.

When CoMP-JP is applied to uplink transmission, eNBs can simultaneously receive a PUSCH signal from a UE (Joint Reception (JR)). In the case of CoMP-CS/CB, only one eNB can receive a PUSCH. Employment of CoMP-CS/CB can be determined by coordinated cells (or eNBs).

Figure 9:
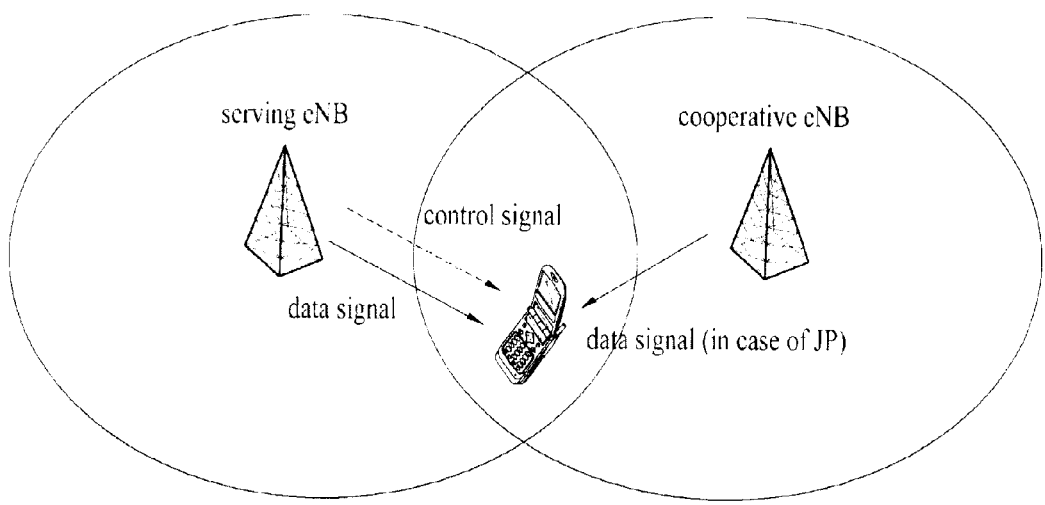
FIG. 9 illustrates a coordinated multi-point (CoMP) transmission system.

FIG. 9 illustrates an exemplary CoMP transmission system. In FIG. 9, it is assumed that a UE, i.e., a CoMP UE receives control information from a serving eNB (s-eNB). In addition, it is assumed that data is simultaneously transmitted from the s-eNB and a cooperative eNB (c-eNB) according to CoMP JP. Data is transmitted from the s-eNB only in the case of CoMP CS/CB and data is transmitted from only the s-eNB and an eNB dynamically selected from a coordinating cell set including one or more c-eNBs in the case of DPS.

While FIG. 9 illustrates only one c-eNB, the present invention is applicable to a coordinating set including a plurality of c-eNBs. Furthermore, the present invention can be applied to not only inter-site CoMP in which an s-eNB and a c-eNB are separated by a large distance, as illustrated in FIG. 9, but also intra-site CoMP in which eNBs in a coordinating set are geographically co-located or heterogeneous networks including a hybrid of inter-site CoMP and intra-site CoMP.

For CoMP transmission, higher CSI accuracy is required. For example, multiple eNBs cooperatively transmit the same data to a specific UE in the CoMP JT system, and thus the CoMP JT system can be regarded as a MIMO system in which antennas are geographically distributed. Accordingly, JT based MU-MIMO requires high CSI accuracy like single-cell MU-MIMO. In the case of CoMP CB, accurate CSI is needed in order to avoid interference of a neighboring cell, applied to a serving cell.

The present invention proposes a periodic CSI reporting method by which a UE periodically feeds back channel state information (CSI) on each base station (or cell) in a coordinating set for CoMP (e.g. CS/CB, JP, etc) operation. The periodic CSI feedback method proposed by the present invention is applicable to non-CoMP operation and dynamic cell selection (DCS) as well as CoMP operation, as necessary. Particularly, the present invention is applicable to a case in which channel information on each cell in a coordinating set is fed back as subband (SB) CSI as well as wideband (WB) CSI. While transmission of a periodic CSI report in PUCCH format 2/2a/2b is assumed for convenience of description, this is exemplary and physical channels carrying the periodic CSI report are not limited thereby.

The present invention assumes that a serving eNB (or serving cell) indicates a periodic CSI reporting configuration with respect to each cooperative eNB (or cooperative cell) to a UE. That is, when N eNBs (or cells) including the serving eNB are present in a coordinating set, a UE receiving downlink signals from the eNBs through JP or CS/CB can receive one periodic CSI reporting configuration for the N eNBs or receive a periodic CSI reporting configuration per eNB (that is, N periodic CSI reporting configurations). When one periodic CSI reporting configuration for the N eNBs is set, CSI reports related to the respective eNBs can be alternately transmitted according to a predetermined or signaled rule/pattern in CSI reporting instances (e.g. subframes) according to the periodic CSI reporting configuration. For example, when subframes for transmitting CSI reports are periodically configured according to the CSI reporting configuration, content of a CSI report transmitted in each subframe can be determined based on a mapping relation between the corresponding subframe and an eNB in the coordinating set. When a periodic CSI reporting configuration is set for each eNB, each CSI reporting configuration is mapped to each coordinating point (i.e. a cooperative eNB or cooperative cell). For example, each CSI reporting configuration can be mapped to a CSI-RS configuration transmitted by each corresponding cooperating point. One of the N CSI reporting configurations needs to be mapped to a serving eNB and this mapping relation may be fixed. For example, a CSI reporting configuration corresponding to the first index can be mapped to the serving eNB. In the case of a CSI report with respect to the serving eNB, the UE can conform to the reporting scheme defined in 3GPP LTE (refer to FIG. 8). It is assumed that one CSI reporting configuration is used for CSI feedback for transmission points in a coordinating set in the following drawings and description. However, this is exemplary and a CSI reporting configuration may be used for each of the transmission points in the coordinating set.

A description will be given of a method for calculating and reporting a PMI and a CQI at each PUCCH transmission time when a specific UE is configured to report CSI with respect to multiple cells for CoMP operation.

An operation of reporting different PMIs at PUCCH transmission instances will now be described first. Here, different PMIs mean that reported PMIs (4 bits used for PMIs if PMI configuration of 3GPP LTE is maintained) target different pieces of channel information. For example, a PMI in CoMP CSI reporting may correspond to one of the following.

Serving cell PMI: PMI indicating channel information regarding a cell from which a UE receives a PDCCH. This can be represented in the form of channel information about a predefined CSI-RS configuration (e.g. channel information on a first CSI-RS configuration index).

Neighboring cell PMI: PMI indicating channel information about a cooperative cell participating in CoMP operation, from which a UE does not receives a PDCCH. This can represent channel information with respect to a CSI-RS configuration other than the CSI-RS configuration used for the serving cell PMI. The detailed form of the neighboring cell PMI may correspond to one of the following.

Effective channel PMI: PMI preferred (or avoided) for a channel of a neighboring cell, which appears after a reception beamforming process at a UE. In a different sense, the effective channel PMI refers to a PMI preferred (or avoided) for a channel of a neighboring cell, which appears when a UE receives a signal of a serving cell through a reception process. For feedback for an effective channel, a PMI codebook defined in 3GPP LTE can be reused. For more accurate feedback, plural rank-1 PMIs may be reported and a matrix generated by taking the rank-1 PMIs as a column vector may be analyzed as a PMI for an effective channel in the case of an RI greater than 2. It is assumed that the effective channel PMI refers to a preferred PMI unless otherwise mentioned for convenience of description.

Best companion PMI: PMI corresponding to maximum MCS that can be achieved by a UE through transmission of the serving cell when used in a neighboring cell. Reporting of the best companion PMI by the UE can be interpreted as recommendation of use of the PMI to the neighboring cell.

Worst companion PMI: PMI corresponding to minimum MCS that can be achieved by a UE through transmission of the serving cell when used in a neighboring cell. Reporting of the worst companion PMI by the UE can be interpreted as recommendation of no use of the PMI to the neighboring cell (or recommendation of use of a PMI separated by a large distance from the worst companion PMI (orthogonal to the worst companion PMI).

Inter-cell CSI: Channel information between two cells participating in CoMP. The inter-cell CSI can represent relative channel information (e.g. a difference) of a neighboring cell with respect to the serving cell. The relative channel information (e.g. difference) may refer to a phase difference and/or an amplitude difference between the serving cell and the neighboring cell. Otherwise, relative channel information may refer to a relative phase and/or amplitude of the neighboring cell, which can appropriately compensate for a difference between a serving cell channel and a neighboring cell channel. Relative channel information between two cells may include a CQI increment that can be obtained through CoMP JT. For example, a UE can feed back, as relative channel information, a CQI variation generated when a serving cell and a cooperative cell perform CoMP JT with respect to a CQI that can be obtained when the serving cell transmits a signal alone. In this case, the serving cell can calculate a CQI that can be transmitted when CoMP JT is performed.

When the UE is configured to perform CoMP CSI reporting, the UE can transmit one of the above-described PMIs in each PUCCH transmission subframe according to a predetermined rule.

Figure 10:
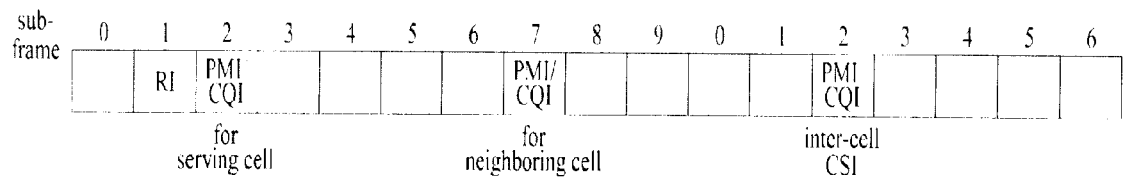

FIG. 10 illustrates CSI reporting according to an embodiment of the present invention.

Referring to FIG. 10, the UE can report a serving cell PMI in subframe #2, report a neighboring cell PMI in subframe #7 and report inter-cell CSI in subframe #2 of the next radio frame. A PMI to be transmitted and a subframe through which the PMI will be transmitted may be predetermined (e.g. three types of PMIs are circulated as illustrated in FIG. 10), or transmission order or positions of PMIs, whether each PMI is transmitted, a PMI transmission period, etc. may be determined through a higher layer (e.g. radio resource control (RRC) layer) signal. Whether or not all or some PMIs are transmitted is not explicitly configured/designated and may be indirectly configured/designated using other information (e.g. PMI transmission period). For example, a specific PMI cannot be transmitted by setting a transmission period of the specific PMI to infinity. That is, the UE can feed back the specific PMI according to CSI configuration when the transmission period of the PMI is set to a finite value (e.g. available PMI transmission period) and may not feed back the PMI when the PMI transmission period is set to an infinite value (or predetermined specific value). In this case, the UE may be configured to report neighboring cell PMIs or inter-cell CSI for one or more neighboring cells.

A description will be given of a CQI calculation method proposed by the present invention. Specifically, the present invention matches a hypothesis for operations of a network and a UE, applied to CQI calculation during PUCCH transmission, to the type of a PMI transmitted along with a CQI. Here, matching of a CQI to a PMI transmitted along with the CQI means that, when a network receives a PMI of a specific type in a subframe, a CQI can be appropriately calculated to enable transmission of a PDSCH that the PMI type targets using a CQI transmitted along with the PMI. The method of calculating a CQI based on the above-described three types of PMIs will now be described in more detail.

Case in which a serving cell PMI is transmitted along with a CQI: The CQI can be calculated on the assumption that a neighboring cell does not perform CoMP operation. In other words, the CQI is calculated on the assumption that the neighboring cell performs a normal transmission operation and inter-cell interference that is not subjected to CoMP operation is generated as a result. In this case, an interference measurement resource needs to include inter-cell interference such that the UE calculates the CQI. According to this scheme, when CoMP operation cannot be performed due to abrupt traffic load increase although the system is configured to perform CoMP operation, a network can switch from CoMP operation to non-CoMP operation.

Case in which a neighboring cell PMI is transmitted along with a CQI: The CQI can be calculated on the assumption that a neighboring cell performs CB during CoMP operation. According to this scheme, precoding information that the neighboring cell needs to select and an MCS level that can be obtained according to the precoding information are simultaneously fed back and thus the network can acquire information necessary for CB operation through one-time PUCCH (CSI) reception. Suppositions for calculation of CQI may depend on the form of the neighboring cell PMI as follows.

Effective channel PMI: The UE can calculate a CQI on the assumption that the corresponding neighboring cell does not transmit a signal in a reported effective channel direction. Similarly, the UE can calculate the CQI on the assumption that the corresponding neighboring cell forms a transmission beam in a direction perpendicular to the reported effective channel. When a signal space orthogonal to the reported effective channel is 2-dimensional or more, the UE can assume that the neighboring cell uniformly allocates power to the signal space. Otherwise, the UE can calculate the CQI on the assumption that interference from the corresponding neighboring cell is not present for convenience of CQI calculation.

Best companion PMI: The UE can calculate a CQI on the assumption that the corresponding neighboring cell uses a reported PMI.

Worst companion PMI: The UE can calculate a CQI on the assumption that the corresponding neighboring cell does not use a reported PMI. Here, no use of the reported PMI may mean that the neighboring cell can use any PMI other than the reported PMI or the neighboring cell can use only a PMI orthogonal to the reported PMI. If the neighboring cell can use a plurality of PMIs, the CQI can be determined as the average, minimum value or maximum value of CQIs obtained with respect to PMIs used by respective neighboring cells. Otherwise, the UE may calculate the CQI on the assumption that interference from the corresponding neighboring cell is not present for convenience of CQI calculation. An interference measurement resource for CQI calculation on the assumption that inter-cell interference is not present need not include inter-cell interference. Accordingly, the UE can be set to use a second interference measurement resource different from an interference measurement resource which was used for CQI calculation on the assumption that the serving cell PMI is transmitted.

Case in which inter-cell CSI is transmitted along with a CQI: The CQI can be calculated on the assumption that a neighboring cell performs JT during CoMP operation. The UE can report a CQI that can be obtained on the assumption that the serving cell and the neighboring cell simultaneously transmit PDSCHs using reported CSI (e.g. on the assumption that the neighboring cell rotates the PMI thereof by a reported phase difference with respect to the serving cell PMI and uses the PMI). Here, the UE can assume that the serving cell performs transmission beamforming using a most recently reported serving cell PMI. Furthermore, the UE supposes a PMI to be used by the neighboring cell as follows.

Supposition based on a most recently reported neighboring cell PMI

If the UE reports an effective channel PMI or a worst companion PMI, the UE can assume that the neighboring cell performs transmission beamforming using a PMI used for effective channel reporting or transmits a PDSCH using the worst companion PMI. If the UE reports a best companion PMI, the UE can calculate a CQI on the assumption that the neighboring cell uses a PMI orthogonal to the reported PMI. If the neighboring cell can use two or more PMIs, the UE can calculate a CQI with respect to each PMI and report the average, maximum value or minimum value of CQIs calculated with respect to the PMIs.

Supposition based on a most recently reported serving cell PMI

The UE can calculate a CQI on the assumption that the corresponding neighboring cell uses a most recently reported serving cell PMI. Since feedback for JT is independent of feedback for CB, this scheme can prevent an error in feedback for CB from affecting feedback for JT.

If the neighboring cell performs JT with the serving cell, the neighboring cell does not cause interference in the UE and thus an interference measurement resource for CQI calculation during JT need not include inter-cell interference. To achieve this, the UE can be configured to calculate the CQI using a different interference measurement resource including no inter-cell interference.

FIG. 11 illustrates CSI feedback according to an embodiment of the present invention. FIG. 11 shows a modification of the above-described operation.

Referring to FIG. 11, a neighboring cell PMI and inter-cell CSI can be transmitted in one subframe. In this case, it is necessary to transmit the neighboring cell PMI and inter-cell CSI in one subframe using a limited PUCCH resource. This can be achieved by reducing the number of bits corresponding to a CQI. For example, in the case of a rank or 2 or more, the number of bits used for CQI reporting can be reduced by reporting a common CQI commonly applied to two codewords instead of reporting CQIs respectively corresponding to the two codewords. In this case, bits obtained by reducing the number of bits used for CQI reporting can be used for CoMP feedback information (e.g. inter-cell CSI). For example, 4 bits of an 11-bit PUCCH resource can be used for the neighboring cell PMI, 4 bits thereof can be used for the common CQI and the remaining 3 bits can be used for the inter-cell CSI. Otherwise, CQI variation with respect to a serving cell CQI, which is commonly applied to two codewords, can be reported. In this case, 3 bits can be used for common delta CQI transmission and 4 bits can be used for inter-cell CSI transmission. When the neighboring cell PMI and the inter-cell CSI are transmitted in one subframe, the CQI may refer to a CQI in the case of CoMP JT.

FIG. 12 illustrates CSI feedback according to an embodiment of the present invention.

Referring to FIG. 12, CoMP PMI/CQI reporting according to the present invention may be performed only when an RI value smaller than a specific value is reported. This is because high throughput can be accomplished without performing CoMP operation if a channel state is improved (e.g. inter-cell interference is remarkably mitigated due to shadowing robust to a channel from a neighboring cell) to enable high rank transmission even though the UE is configured to perform feedback for CoMP and, if a desired signal occupies a large area of a signal space due to high rank transmission, the neighboring cell has difficulty in avoiding the occupied area and performing CB operation for forming a beam. In this case, for more effective feedback, the UE can perform CoMP PMI/CQI reporting according to configuration if a reported RI is less than a predetermined threshold value (e.g. the UE sequentially performs serving cell CSI reporting, neighboring cell CSI reporting and inter-cell CSI reporting in each PMI/CQI reporting instance) (FIG. 12(*a*)). If the reported RI is greater than the threshold value, the UE can perform PMI/CQI reporting only for single cell operation (e.g. the UE reports the serving PMI/CQI only in all PMI/CQI reporting instances) (FIG. 12(*b*)). The threshold value of the RI can be predetermined as a specific value such as 1 or 2 and may be set through a CSI report configuration message.

FIG. 13 illustrates CSI feedback according to an embodiment of the present invention.

Referring to FIG. 13, the above-described CoMP PMI/CQI reporting operation based on the RI may be effectively combined with dynamic cell selection operation. When the UE performs feedback for dynamic cell selection, the UE can select a cell having the best channel state and report a PMI/CQI of the cell at each feedback instance. In this case, the UE needs to additionally report a cell indicator for indicating a cell to be reported. However, it is difficult to additionally report the cell indicator because the number of bits that can be simultaneously transmitted is limited when CSI is reported through a PUCCH. To solve this problem, bits representing a CQI difference between two codewords in conventional CSI feedback may be used as the cell indicator. That is, when the UE transmits 11-bit CSI feedback, 4 bits can be used for a PMI, 4 bits can be used for a CQI and the remaining 3 bits (fewer bits may be used when fewer cells are to be selected) can be used for the cell indicator.

The above-described feedback operation for dynamic cell selection may not coexist with high rank feedback because it is desirable to respectively report CQIs for two codewords on the assumption that the two codewords are transmitted in the case of high rank feedback. Furthermore, CoMP operation such as dynamic cell selection may not be needed when high rank feedback is possible. Since the purpose of CoMP operation is improved performance of a UE in a poor channel state due to severe inter-cell interference, the UE can perform satisfactory operation without using CoMP if the UE is in a channel state in which a high transmission rank is possible. For this reason, when a UE transmits CoMP CSI feedback including the cell indicator for dynamic ell selection, the cell indicator can be reported only when the RI is less than a specific value (e.g. RI=1) (FIG. 13(*a*)). A PMI reported along with the cell indicator may be a serving cell PMI or neighboring cell PMI according to the cell indicator. When the RI is greater than the specific value (e.g. RI>1), the UE may not transmit the cell indicator (FIG. 13(*b*)). When the cell indicator is not transmitted, the corresponding PMI/CQI can be regarded as a CSI report for a specific cell (e.g. serving cell or a cell corresponding to a first CSI-RS configuration).

When bits representing a CQI difference between two codewords are used as the cell indicator, as described above, in the case of an RI greater than 2, the following methods can be applied.

A CQI is considered as a common CQI of two codewords: The two codewords can be considered as having the same CQI when the cell indicator is transmitted.

The number of bits representing a CQI difference is reduced: it can use only some of bits representing a CQI difference in a conventional format. Consequently, the number of bits representing the CQI difference between the two codewords may be decreased. Instead, the cell indicator can be transmitted using remaining bit(s) except the number of bits representing the CQI difference. For example, if the CQI difference between the two codewords was represented using 3 bits in a conventional system, the CQI difference can be indicated using 2 bits from among the 3 bits and the remaining bit can be used as the cell indicator. The number of bits to be used to indicate a CQI difference may be determined through higher layer signaling such as RRC signaling and, particularly, can be determined based on the number of cells (or the number of CSI-RS configurations) measured by the UE. For example, if the UE measures two cells, 2 bits can be used to indicate the CQI difference because a 1-bit cell indicator is needed. If the UE measures three or four cells, 1 bit can be used to indicate the CQI difference because a 2-bit cell indicator is needed.

Figure 14:
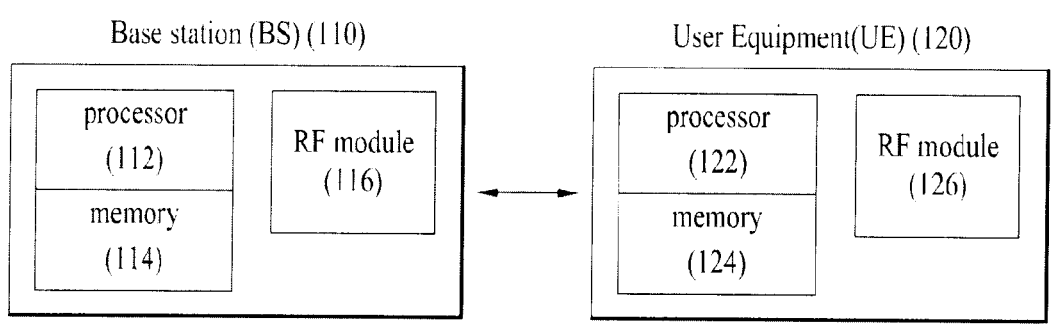
FIG. 14 illustrates a base station, a relay and a UE applicable to embodiments of the present invention.

FIG. 14 illustrates a BS, a relay and a UE applicable to an embodiment of the present invention.

Referring to FIG. 14, a wireless communication system includes a base station (BS) 110, a relay (RN) 130 and a UE 130. While FIG. 14 illustrates the UE connected to the relay, the UE may be connected to the BS.

The BS 110 includes a processor 112, a memory 114 and an RF unit 116. The processor 112 may be configured to implement the procedures and/or methods proposed by the present invention. The memory 114 is connected to the processor 112 and stores various types of information relating to operations of the processor 112. The RF unit 116 is connected to the processor 112 and transmits and/or receives RF signals. The relay 120 includes a processor 122, a memory 124 and an RF unit 126. The processor 122 may be configured to implement the procedures and/or methods proposed by the present invention. The memory 124 is connected to the processor 122 and stores various types of information relating to operations of the processor 122. The RF unit 126 is connected to the processor 122 and transmits and/or receives RF signals. The UE 130 includes a processor 132, a memory 134 and an RF unit 136. The processor 132 may be configured to implement the procedures and/or methods proposed by the present invention. The memory 134 is connected to the processor 132 and stores various types of information relating to operations of the processor 132. The RF unit 136 is connected to the processor 132 and transmits and/or receives RF signals. The BS 110, relay 120 and UE 120 may have a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a wireless communication such as a UE, a relay, a BS, etc.

The invention claimed is:

1. A method for reporting Channel State Information (CSI) at a User Equipment (UE) in a wireless communication system, the method comprising:
receiving configuration information for a periodic CSI report from a first transmission point; and
transmitting, to the first transmission point, a CSI report for a transmission point of plural transmission points through a subframe of subframes being periodically configured according to the configuration information, the transmission point corresponding to the subframe,
wherein, if rank information reported to the first transmission point prior to the CSI report is equal to or less than a threshold value, the one or more subframes corresponding to a second transmission point are used to transmit a CSI report for multi-transmission point cooperative transmission;
wherein if the rank information reported to the first transmission point prior to the CSI report is greater than the threshold value, the one or more subframes corresponding to the second transmission point are used to transmit a CSI report for single transmission point transmission.

2. The method according to claim 1, wherein the CSI report for the multi-transmission point cooperative transmission includes information indicating a relative channel state between downlink signals of the two transmission points.

3. The method according to claim 2, wherein the information indicating the relative channel state includes information indicating a phase difference or an amplitude difference between downlink signals of the two transmission points.

4. The method according to claim 1, wherein the CSI report for multi-transmission point cooperative transmission includes cell-selection indication information.

5. The method according to claim 4, wherein the CSI report for the multi-transmission point cooperative transmission further includes a Channel Quality Indicator (CQI), wherein the CQI is calculated assuming a Coordinated Multi Point Joint Processing (CoMP-JP) mode.

6. The method according to claim 1, wherein the first transmission point is a serving base station and the second transmission point is a cooperative base station.

7. A UE configured to report Channel State Information (CSI) in a wireless communication system, comprising:
a radio frequency (RF) module; and
a processor,
wherein the processor configured to receive configuration information for a periodic CSI report from a first transmission point, and to transmit, to the first transmission point, a CSI report for a transmission point of plural transmission points through a subframe of subframes being periodically configured according to the configuration information, the transmission point corresponding to the subframe,
wherein, if rank information reported to the first transmission point prior to the CSI report is equal to or less than a threshold value, the one or more subframes corresponding to a second transmission point are used to transmit a CSI report for multi-transmission point cooperative transmission;
wherein if the rank information reported to the first transmission point prior to the CSI report is greater than the threshold value, the one or more subframes corresponding to the second transmission point are used to transmit a CSI report for single transmission point transmission.

8. The UE according to claim 7, wherein the CSI report for the multi-transmission point cooperative transmission includes information indicating a relative channel state between downlink signals of the two transmission points.

9. The UE according to claim 8, wherein the information indicating the relative channel state includes information indicating a phase difference or an amplitude difference between downlink signals of the two transmission points.

10. The UE according to claim 7, wherein the CSI report for multi-transmission point cooperative transmission includes cell-selection indication information.

11. The UE according to claim 10, wherein the CSI report for the multi-transmission point cooperative transmission further includes a Channel Quality Indicator (CQI), wherein the CQI is calculated assuming a Coordinated Multi Point Joint Processing (CoMP-JP) mode.

12. The UE according to claim 8, wherein the first transmission point is a serving base station and the second transmission point is a cooperative base station.

* * * * *